Patented Aug. 10, 1943

2,326,577

UNITED STATES PATENT OFFICE 2,326,577

REMOVAL OF MUD CAKE IN CASING CEMENT JOBS

James U. Teague, New Orleans, La., and George E. Cannon, Houston, Tex., assignors to Standard Oil Development Company, a corporation of Delaware No Drawing. Original application September 27, 1939, Serial No. 296,734. Divided and this application January 1, 1943, Serial No. 471,022

2 Claims. (Cl. 166—22)

The present invention relates to the cementing of casing into a bore hole and is a division of U. S. Ser. No. 296,734, filed September 27, 1939.

In completing wells it is common to set a casing in the bore hole. A cement mixture is then pumped into casing so that it passes out of the lower end of the casing and rises in the annular space between the casing and the bore hole and is then allowed to set in this annular space forming a plug. This cement plug in the lower end of the bore hole may serve several valuable purposes. It is quite often the case, particularly when drilling oil wells, that several formations producing water are drilled through before the oil producing formation is reached. By cementing the lower end of the casing, the water producing formations above the oil producing formations are sealed off from the oil producing formation and are prevented from producing the water along with the oil and perhaps eventually drowning the oil well. It is also quite usual for an oil formation to have a gas cap or for the oil in the formation to contain dissolved gas and under such conditions the cementing of the casing may prevent gas from flowing up to the surface of the earth in the space between the bore hole wall and the casing, or may serve to reduce the gas-oil ratio in the oil produced.

It has been found that in many instances the cementing of the lower end of the casing produced unsatisfactory results in that a tight seal is not established between the formation and the casing wall. Many disadvantages arise from the failure of a cementing job. It is quite often necessary to go back into the hole and recement the casing in order to shut off excess gas or to stop the flow of water into the hole.

It has now been found that in many cases a poor cementing job is due to the fact that the conventional mud filter cake formed on the walls of the hole during the rotary drilling operation prevents the cement from forming a tight bond with the formation.

It has now been discovered that by removing the mud cake from the portion of the hole where the cement is to be deposited the cement will form a tight bond between the formation penetrated by the bore hole and the wall of the casing and will form an effective seal in the bore hole.

Several methods are available to remove a filter cake from the wall of a bore hole. One of the methods is to pump a dispersing agent ahead of the cement in carrying out the cementing job. Suitable dispersing agents are sodium hexametaphosphate, sodium metasilicate, alkaline tannate solution and other like chemicals which are used to reduce the viscosity of drilling mud. When these dispersing agents pass across the face of the filter cake they tend to soften, disperse and remove the cake. While on some occasions they may not completely remove the cake, yet their action is such that when the cement is pumped into the bore hole the cake is so soft that the cement removes the cake as it flows upwardly in the annular space between the casing and the bore hole.

Another method of removing the mud cake from the portion of the bore hole where the cement is to be deposited is by increasing the abrasiveness of the cement slurry used for cementing the casing. In other words, while it is usual in cementing jobs to use neat cement, that is a mixture of Portland cement and water, we have found that by mixing sand or other similar materials which are harder and have a larger particle size than cement with the cement an abrasive mixture was obtained which when pumped into the bottom of the hole and across the face of the filter cake erodes and removes the mud filter cake from the wall of the formation and allows the cement cake to bond directly from the formation to the wall of the casing.

Under some circumstances, it may be advisable to combine the two above mentioned methods. In carrying out this procedure a dispersing agent is pumped ahead of the cement and in addition abrasive particles are added to the cement mixture which is pumped down after the dispersing agent. Any part of the mud cake which is not removed by the dispersing agent is readily removed by the mixture of cement and abrasive material which follows the dispersing agent.

Modifications of the above described preferred forms of the invention will suggest themselves to a skilled worker and it is, therefore, not our intention to be limited to the above described procedures, but only by the limitations expressed in the claims appended hereto.

We claim:

1. In the cementing of casing in a bore hole the step of using cement slurry mixed with sand.

2. In the cementing of casing in a bore hole the step of using cement slurry mixed with particles of an abrasive material, said abrasive particles having a larger size and greater hardness than the cement particles in the slurry.

JAMES U. TEAGUE.
GEORGE E. CANNON.